Patented July 9, 1940

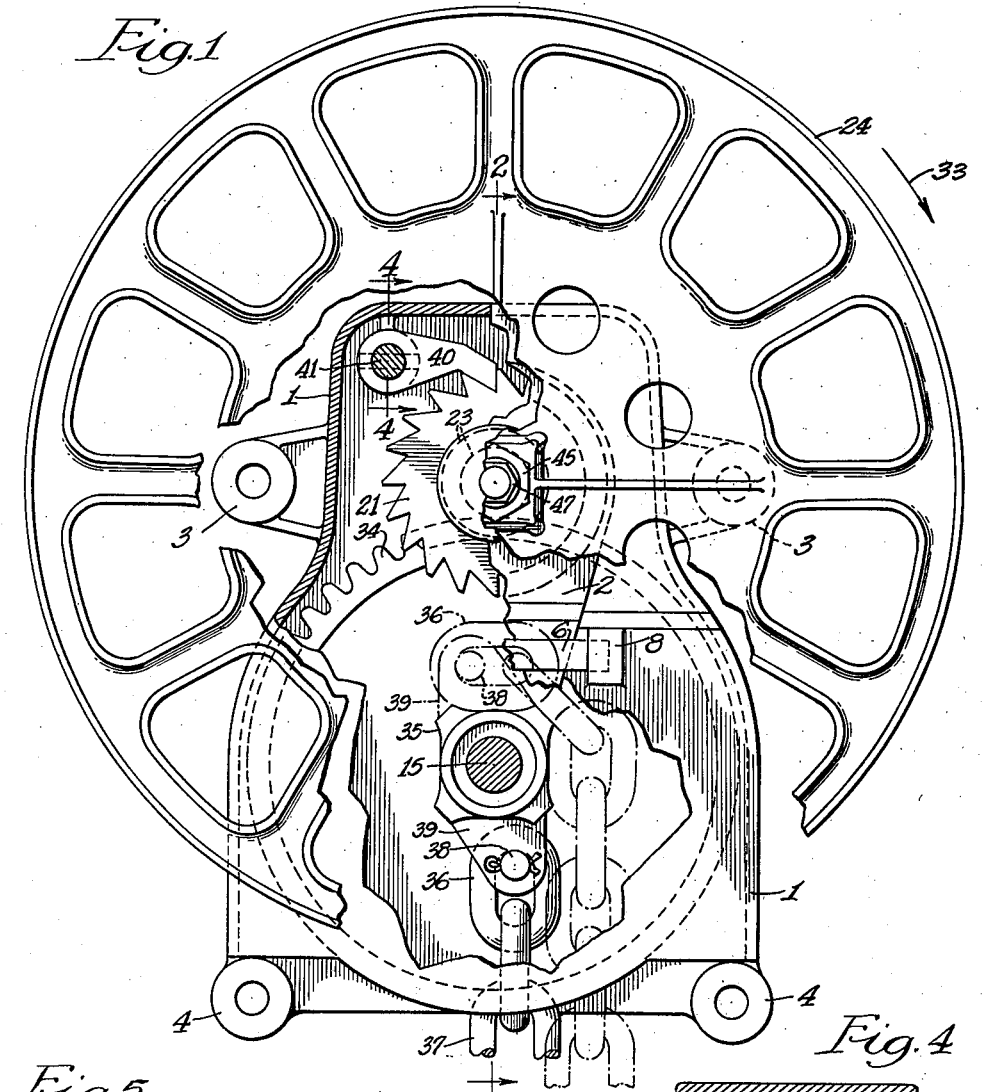

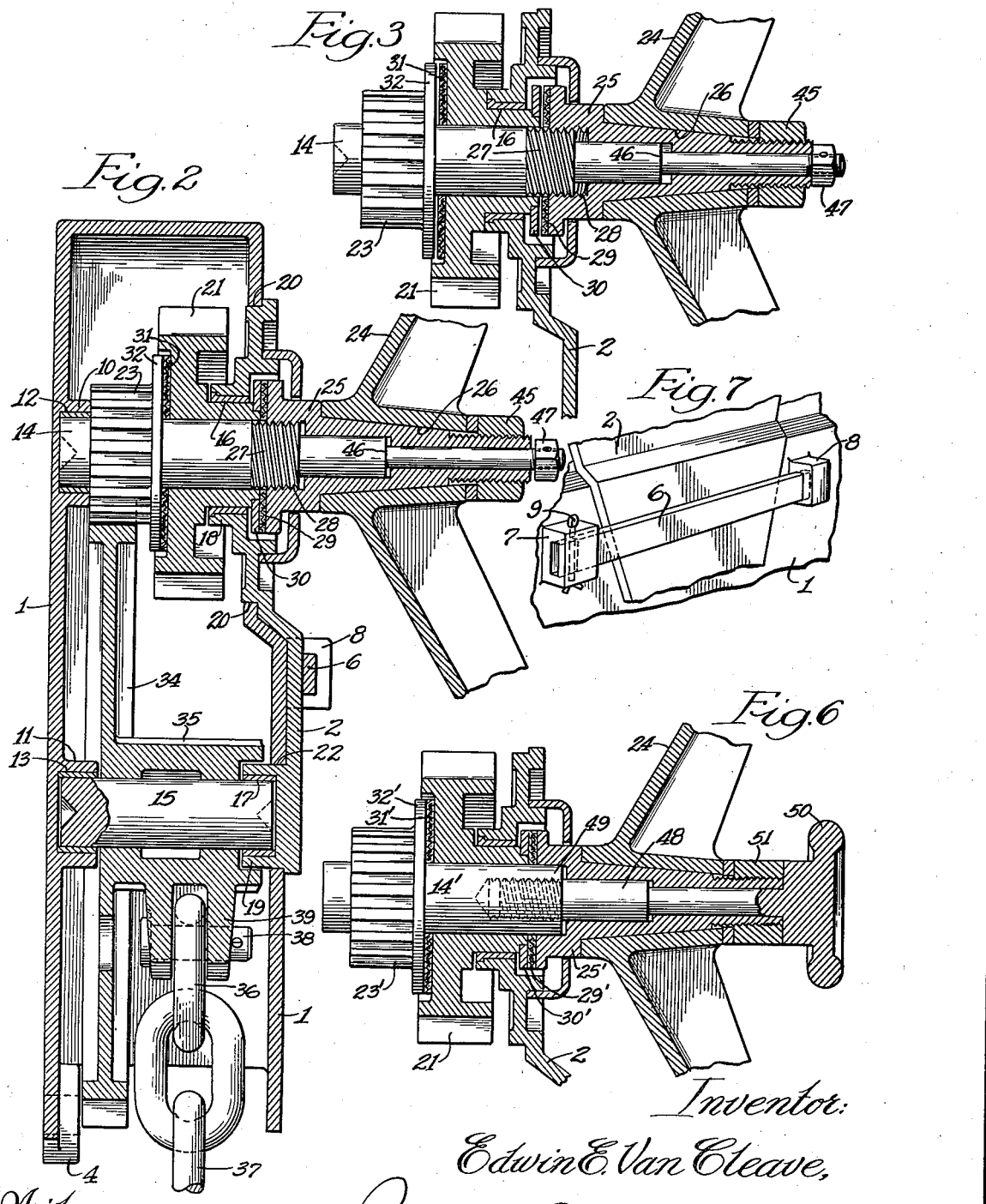

2,207,500

UNITED STATES PATENT OFFICE 2,207,500

HANDWHEEL BRAKE OPERATING MECHANISM

Edwin E. Van Cleave, Chicago, Ill.

Application June 16, 1937, Serial No. 148,520

4 Claims. (Cl. 74—505)

This invention relates to the class of brake operating means used on railway cars for supplementing air brakes to afford manually actuated brake application means. A principal purpose of the invention is the provision of a mechanism which is automatic to effect holding proportional to the degree of reverse rotation of the handwheel in a releasing direction; that is, when the handwheel is turned in that direction the mechanism cannot spin to full release position nor is the partial holding back of the brakes dependent upon the strength of the operator. The wheel may be given increments of motion by the operator in the releasing direction and at the termination of each increment of motion the brakes are held partially applied exactly according to the setting of the handwheel.

It is also an object of the invention to provide improvements in handbrake operating mechanism by simplifications enabling the use of few and efficient parts, compactness, and rapid easy assembly thereof and quick accessibility to all parts of the mechanism for the purpose of replacement, if necessary.

The objects of the invention are attained by means of a construction as illustrated in the drawings wherein:

Fig. 1 is a face view of the handwheel brake operating mechanism with the casing and wheel shown as partly broken away to expose the mechanism inside of the casing.

Fig. 2 is a vertical sectional view as indicated by the line 2—2 on Fig. 1.

Fig. 3 is a fragmentary sectional view of part of the mechanism shown in Fig. 2 for comparison therewith to show disengaged relationship of clutch elements.

Fig. 4 is a sectional detail as indicated by the line 4—4 on Fig. 1.

Fig. 5 is a similar section to that shown in Fig. 4, but shows the ratchet holding pawl with an operating lever whereby the pawl may be manually engaged or disengaged, if desired.

Fig. 6 is a sectional view similar to that shown in Fig. 3 but with the addition of a separate wheel for actuating the clutch.

Fig. 7 is a fragmentary perspective view showing how the casing and a cover plate thereof are locked together without the use of rivets or other fastening means interfering with quick assembly or disassembly of the construction.

A distinguishing principle of the improvement with reference to other handbrake operating mechanisms is its action. The handwheel is secured to the pinion shaft by which motion is transmitted through gearing and the winding sprocket and chain, to the brake rigging.

Thus, there is a direct driving connection between the handwheel and the brake rigging and the handwheel would ordinarily spin in a reverse direction upon release of the brakes, were it not for a clutch arrangement which is automatic in its action to stop reverse motion of the handwheel and full release of the brake exactly in accordance to how far the operator turns the handwheel in the brake releasing direction. If the operator, by his own volition, spins the handwheel in a releasing direction faster than the automatic reverse motion of the brake mechanism, the brakes may move to fully released position without interruption.

When the operator moves the handwheel by step increments in a releasing direction, the mechanism provides for an automatic take-up which holds the brakes applied more or less according to the steps of movement given the handwheel.

This effect is produced by the use of a particular combination of a driving pinion shaft and a handwheel forming a positive drive for the brake mechanism, except for a slight relative motion between the handwheel and the shaft for the purpose of clutching and unclutching the shaft to a holding ratchet.

As shown in the drawings, the operating mechanism is supported in a casing 1 which may be riveted in the customary position on an end wall of a railway car at the perforated ears 3 and 4, integral with the casing. The casing is closed by a front plate 2. This cover plate is held in assembled relation with the casing by a bar 6 passing through openings in lugs 7 and 8 formed on the casing.

The bar is held in retaining position by cotter pin 9. Casing 1 has the bosses 10 and 11 for receiving the bearing sleeves 12 and 13 for shafts 14 and 15. These shafts are also supported by bearing sleeves 16 and 17 carried in the bosses 18 and 19 formed on the cover plate 2. The cover plate is made to fit an annular opening 20 in casing 1 which is equal to the diameter of a ratchet wheel 21. The ratchet wheel may be passed through this opening when the construction is assembled. The boss 19 of plate 2 also fits a circular opening 22 in casing 1.

The driving pinion 23, integral or fast with shaft 14 and the handwheel 24, is also supported on shaft 14 through an adapter 25 which fits the square opening 26 in the hub of the wheel. The wheel turns with the shaft, except for a slight angular relative motion between the two provided for by a threaded or spiral connection between the shaft and the adapter. The shaft is accordingly, threaded at 27 while the adapter has the internal thread 28. The adapter has a clutch surface 29 for engagement with the clutch disc 30 fast to the hub of ratchet wheel 21.

The ratchet wheel is also faced with a clutch disc 31 for coaction with a flange 32 on pinion 23. By turning the wheel 24 in a right hand direction, as indicated by the arrow 33 (Fig. 1), the initial motion of the wheel is free of the pinion shaft until it is turned far enough on the thread 27 to change the relationship of the coacting clutch elements from that indicated by Fig. 3 to that indicated by Fig. 2.

In Fig. 3 the ratchet wheel is free of the pinion shaft and in Fig. 2 the ratchet wheel is shown clamped to the pinion shaft between the flange 32 on the pinion and the clutch facing 29 on the wheel adapter 25. The arrangement provides a direct drive between the handwheel and the brake rigging in either application or release directions. Right hand motion of the handwheel is transmitted through shaft 14 and the pinion thereon to gear 34 meshing with the pinion and integral with winding sprocket 35 to which the end link 36 of the brake operating chain 37 is secured by pin 38 passing through apertured ears 39 formed on the sprocket.

The ratchet wheel 21 never rotates backwardly, except for a fraction of a tooth space. It is held against backward rotation by gravity pawl 40. The pawl is ordinarily loose on its supporting pin 41 which is pinned to casing 1 as shown in Fig. 4, but when it is desired to provide the pawl with an operating lever it is mounted as shown in Fig. 5. The pawl is then pinned to a shaft 42, as indicated at 43. Operating lever 44 is secured to the shaft.

The hand wheel is rigidly clamped to the adapter 25 by nut 45 and the adapter and handwheel are limited in motion along shaft 14 by the shoulder 46 and the nut 47 pinned to shaft 14.

When the brakes are applied as far as possible by right hand rotation of handwheel 24 there is a reaction pressure from the brakes ordinarily amounting to about 4,000 pounds which is resisted through the gearing by pawl 40. When the handwheel is turned to the left sufficiently to unclutch the ratchet wheel 21 from shaft 14, the shaft is free to rotate under the reaction of the brakes and instantly causes the clutch to re-engage by screwing the clutch back into clamping position according to the inertia or the drag on wheel 24 applied by the operator or by the friction element 29. However, if the wheel is deliberately spun faster than the releasing motion of the brakes, the brakes may be entirely freed of the holding resistance of the ratchet; otherwise, the freeing motion of the brakes is by increments according to left hand motion imparted to handwheel 24 by the operator. This is a convenient and safe way of releasing the brakes. The clutch lining 29 offers resistance to the backward rotation of the handwheel and prevents instantaneous violent release of the brakes such as occurs when a ratchet pawl is withdrawn from a ratchet wheel. The effective area of clutch 29 is less than that of clutch 31 since the latter has the function of holding the brake, while the former will slip more easily than the latter.

Many brake operating mechanisms of the reverse spin type and others of the non-spin type, except with extraordinary exertion of the operator, have the disadvantage of instantaneous full release of the brakes rather than any desired partial release that may be wanted for controlling a car. Some of the features of the device herein shown, but not claimed, are claimed in my co-pending application Serial No. 147,827 filed June 12, 1937.

Fig. 6 shows a modification whereby the handwheel 24 and an adapter 25' are mounted on a shaft 48 and are ordinarily free to rotate ineffectively on the shaft. These may, however, be connected to the pinion 23' and shaft 14' through clutches 29', 30', 31', and 32'. This is done by, instead of making the shaft in one part as in Figs. 2 and 3, making the shaft of interfitting sections 14' and 48, which have threaded engagement at 49. A small clutch operating wheel 50 is formed at the outer end of shaft 48. By turning the wheel in a right hand direction it is screwed into shaft 14', drawing that section of the shaft and section 48 together. Wheel 50 bears against the end of the adapter 25' and the handwheel fastening nut 51. This serves to force the adapter and the pinion 23' against opposite sides of the ratchet wheel engaging it at the clutch surfaces. By such a means the ratchet is rendered effective or ineffective for holding the brake, and the handwheel 24 is at the same time clamped to the operating mechanism for operation, or released therefrom.

The assemblage of the mechanism is a simple matter and may be as follows:

The bushings 12 and 13 are first slipped into the bosses 10 and 11 of casing 1; axle 15 and the gear 34, with the sprocket are placed in position; then the face plate 2 with the handwheel unit assembled therein, comprising wheel 24, shaft 14, ratchet wheel 21, and the pinion 23, are placed into position in the casing 1 and locked thereto by bar 6.

I claim:

1. In a railway car hand brake mechanism, the combination with a rotary chain winding drum, of a gear fixed thereto for rotation in unison therewith, a driving pinion meshing with the gear, a rotary operating shaft to which the pinion is fixed, a ratchet wheel loose on the shaft, a pawl for holding the ratchet wheel in one direction, a clutch cooperating with the shaft and ratchet wheel to clutch and unclutch the ratchet wheel and the shaft, a hand wheel attached to one end of the shaft, said shaft having a square tapered end for receiving the hand wheel for a non-rotating connection and arranged for easy removal of hand wheel without affecting the clutching mechanism in either its clutched or unclutched positions.

2. In a railway car hand brake mechanism, the combination with winding mechanism including a horizontal shaft having a driving pinion fixed thereto, an extension for the shaft having threaded engagement with the shaft, said extension being provided with a tapered square end, an operating wheel removably attached to the square end of the extension, a ratchet wheel loose on the pinion shaft, a pawl for holding the ratchet wheel against movement in one direction, a clutch cooperating with the shaft and the ratchet wheel to clutch and unclutch the ratchet wheel and the shaft, said clutch being arranged for operation by relative movement between the pinion shaft and the extension thereof on the threaded connection between the shaft and the extension.

3. In a railway car hand brake mechanism a housing and winding mechanism mounted in the housing, said housing including a detachable supporting plate for winding mechanism, a bearing in the plate, operating mechanism mounted in said bearing and including a driving pinion for driving said winding mechanism, a hand wheel and a connection between the hand wheel and pinion providing for limited relative movement between the hand wheel and pinion, and said connection including clutching means for positively connecting and disconnecting the hand wheel with the driving pinion upon relative movement between the hand wheel and the pinion.

4. In a railway car hand brake mechanism, the combination with a rotary chain winding drum, of a gear fixed to the chain winding drum, a driving pinion meshing with the gear, a rotary operating shaft to which the pinion is fixed, means for holding the shaft against rotation in one direction, a clutch cooperating with the shaft and holding means for clutching and unclutching the holding means and the shaft, a hand wheel, and means for connecting the hand wheel and shaft arranged for removal of the hand wheel without affecting the clutching mechanism in either its clutched or unclutched positions.

EDWIN E. VAN CLEAVE.